(12) United States Patent
Chen et al.

(10) Patent No.: US 8,782,036 B1
(45) Date of Patent: Jul. 15, 2014

(54) ASSOCIATIVE MEMORY BASED DESKTOP SEARCH TECHNOLOGY

(75) Inventors: Jidong Chen, Beijing (CN); Hang Guo, Beijing (CN)

(73) Assignee: EMC Corporation, Hopkinton, MA (US)

( * ) Notice: Subject to any disclaimer, the term of this patent is extended or adjusted under 35 U.S.C. 154(b) by 222 days.

(21) Appl. No.: 12/629,952

(22) Filed: Dec. 3, 2009

(51) Int. Cl.
*G06F 17/30* (2006.01)

(52) U.S. Cl.
USPC ............ 707/723; 707/737; 707/741; 707/748

(58) Field of Classification Search
None
See application file for complete search history.

(56) References Cited

U.S. PATENT DOCUMENTS

| | | | |
|---|---|---|---|
| 2002/0013834 A1* | 1/2002 | Esakov et al. | 709/223 |
| 2004/0128270 A1* | 7/2004 | Bachman et al. | 707/1 |
| 2004/0205065 A1* | 10/2004 | Petras et al. | 707/5 |
| 2005/0144162 A1* | 6/2005 | Liang | 707/3 |
| 2005/0222987 A1* | 10/2005 | Vadon | 707/3 |
| 2006/0026147 A1* | 2/2006 | Cone et al. | 707/3 |
| 2007/0011020 A1* | 1/2007 | Martin | 705/1 |
| 2007/0043704 A1 | 2/2007 | Raub et al. | |
| 2007/0112732 A1* | 5/2007 | Clark et al. | 707/3 |
| 2007/0136234 A1* | 6/2007 | Levin et al. | 707/2 |
| 2008/0243785 A1* | 10/2008 | Stading | 707/3 |
| 2009/0157617 A1* | 6/2009 | Herlocker et al. | 707/3 |
| 2009/0171813 A1* | 7/2009 | Byrne et al. | 705/27 |
| 2009/0282022 A1* | 11/2009 | Bennett | 707/5 |
| 2010/0094878 A1* | 4/2010 | Soroca et al. | 707/748 |

* cited by examiner

*Primary Examiner* — Mohammad S Rostami
(74) *Attorney, Agent, or Firm* — Krishnendu Gupta; Joseph D'Angelo

(57) ABSTRACT

An embodiment of the current invention is a computer implemented method and computer product for searching resources of a computer system comprising, enabling a user to input a keyword, wherein the keyword is used to generate a list of search results corresponding to resources, enabling the user to select one or more filters of a plurality of filters, wherein selection of a filter filters the list of search results of the resources and displaying the resources and associations between the filtered list of the resources based on the keyword and selection of filters; wherein the associations represent a user's interactions with the resources of the computer system. An alternative embodiment of the current invention is a computer implemented method and computer product for creating searchable associations of a user's interaction with a computer system's resources comprising recording the user's interactions with the computer system's resources, and creating associations between the resources based on the user's interactions.

20 Claims, 15 Drawing Sheets

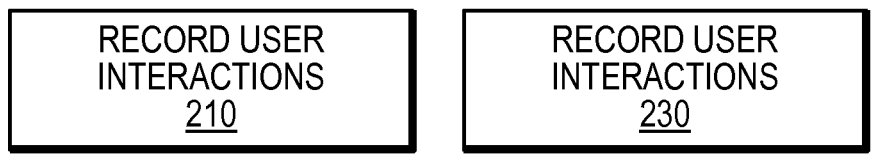
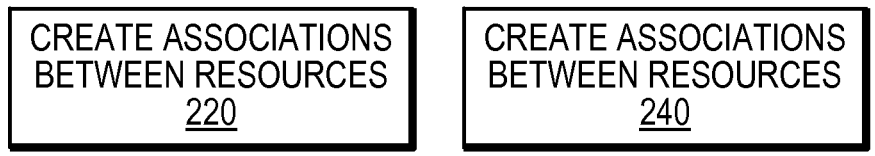
Figure 2A
Figure 2B

| CREATE SEARCH |
| 810 |

| EXECUTE SEARCH |
| 815 |

| DISPLAY RESULTS |
| 820 |

Figure 8A

| CREATE SEARCH |
| 830 |

| EXECUTE SEARCH |
| 835 |

| DISPLAY RESULTS |
| 840 |

| FILTER RESULTS |
| 850 |

Figure 8B

| CREATE SEARCH |
| 850 |

| EXECUTE SEARCH |
| 860 |

| RANK SEARCH RESULTS |
| 865 |

| DISPLAY RESULTS |
| 870 |

Figure 8C

| CREATE SEARCH |
| 875 |

| EXECUTE SEARCH |
| 880 |

| RANK SEARCH RESULTS |
| 885 |

| PERSONALIZE RANKED SEARCH RESULTS |
| 890 |

| DISPLAY RESULTS |
| 895 |

Figure 8D

| LINK | TYPE | RESOURCES |
|---|---|---|
| SAME_TASK | IAA | DOCUMENT FILES, EMAILS AND VISITED WEB PAGES |
| PROVENANCE_OF | IAA | DOCUMENT FILES, EMAILS AND VISITED WEB PAGES |
| SAVE_AS | EAA | VISITED WEB PAGES, EMAIL ATTACHMENTS AND FILES |
| COPY_FROM | EAA | FILES |
| JUMP_TO | EAA | VISITED WEB PAGES |
| SIMILAR_TO | CA | FILES |
| REPLY_TO | CA | EMAIL MESSAGES |
| RECEIVED_FROM | CAA | EMAIL MESSAGES |
| HAS_ATTACHMENT | CA | EMAIL MESSAGES AND EMAIL ATTACHMENTS |
| OWNED_BY | CA | FILES |
| CONTAINED_IN | CA | FILES AND FOLDERS |

FIG. 10

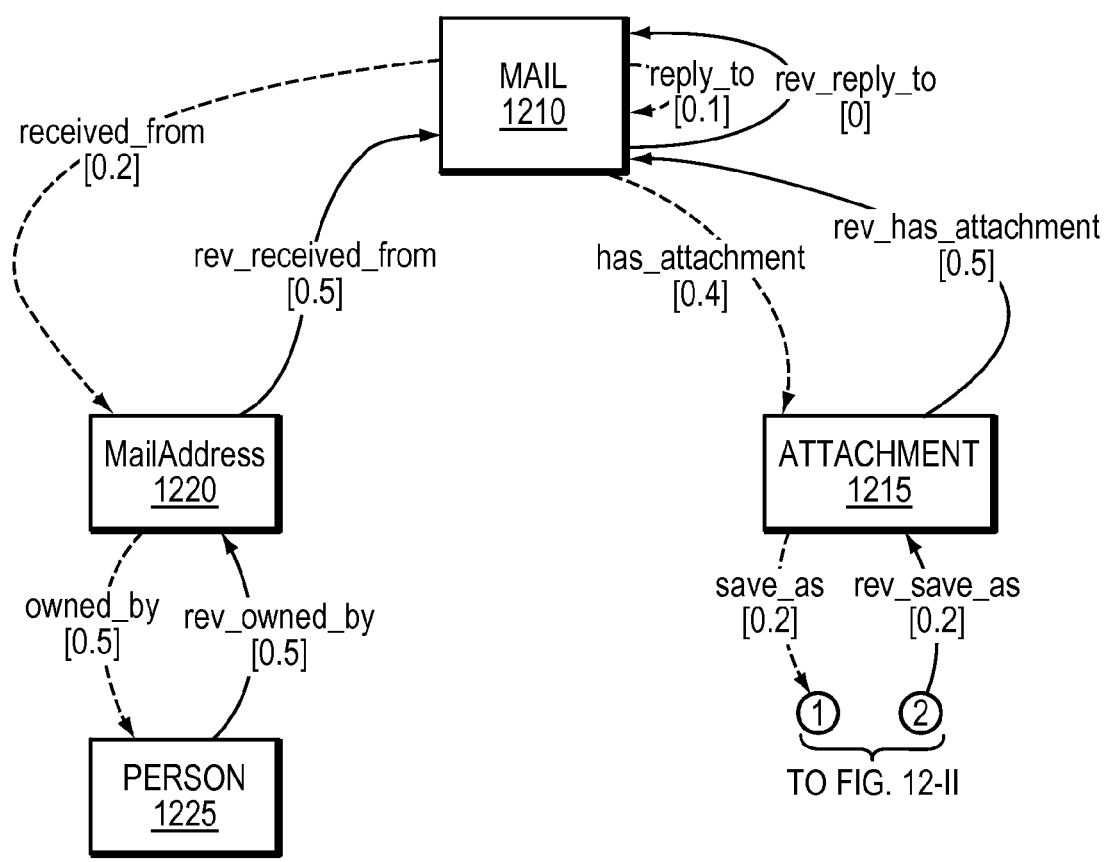
FIG. 12-I

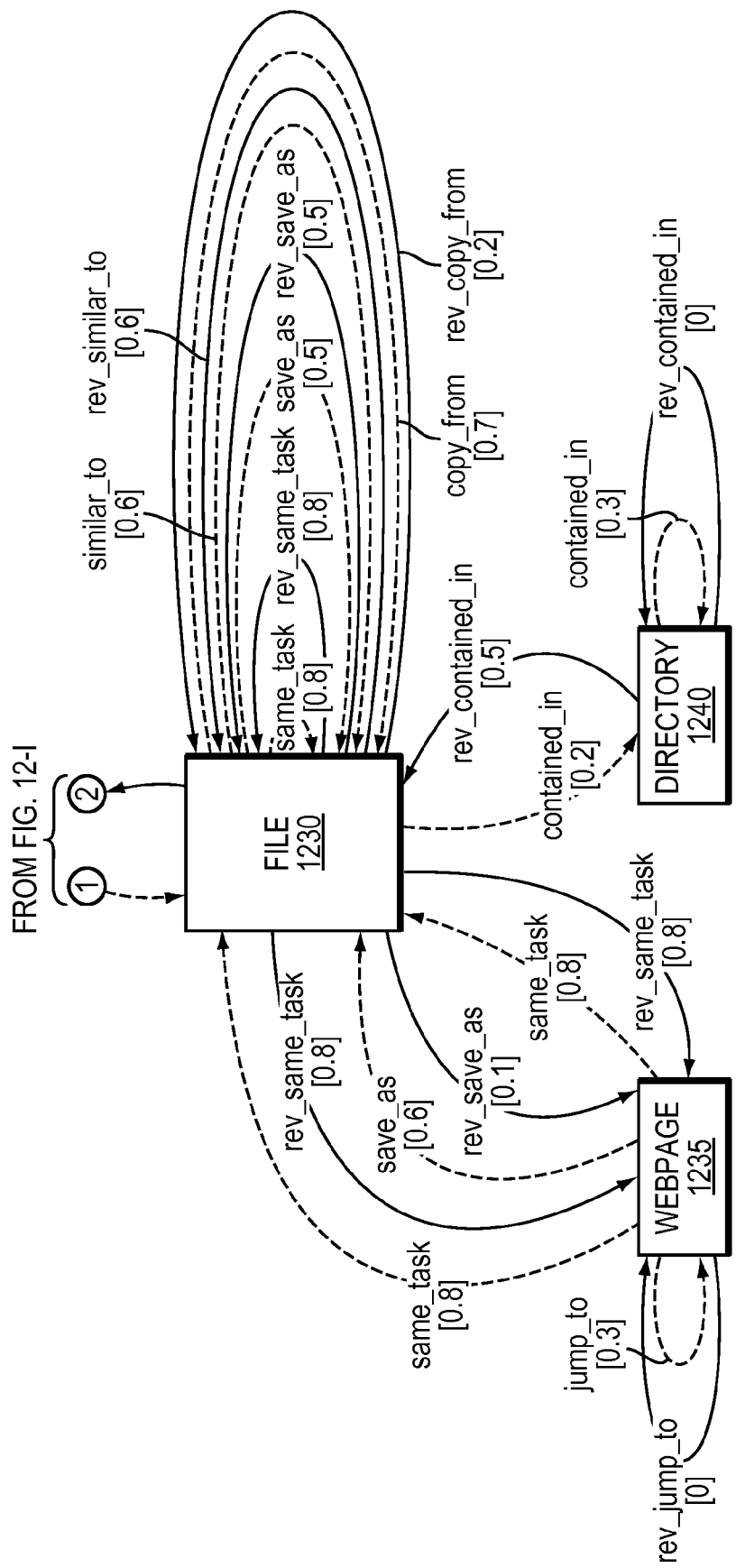
FIG. 12-II

ASSOCIATIVE MEMORY BASED DESKTOP SEARCH TECHNOLOGY

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application related to Desktop Search methods.

BACKGROUND

Computer systems generally include one or more host processors and a storage system for storing data accessed by the host processor. The storage system may include one or more storage devices (e.g., disk drives) to service the storage needs of the host processor. Disk drives may include one or more disks of a recording media, such as a magnetic recording medium or an optical recording medium. A user may store information on the storage medium.

As computers become more important, a user may want to search the computer system for resources located on the computer system. Traditional desktop search engines may use keyword based search invention that can require exact keyword matching to find resources. An improvement on this system would be desirable.

SUMMARY

An embodiment of the current invention is a computer implemented method and computer product for searching resources of a computer system comprising, enabling a user to input a keyword, wherein the keyword is used to generate a list of search results corresponding to resources, enabling the user to select one or more filters of a plurality of filters, wherein selection of a filter filters the list of search results of the resources and displaying the resources and associations between the filtered list of the resources based on the keyword and selection of filters; wherein the associations represent a user's interactions with the resources of the computer system.

An alternative embodiment of the current invention is a computer implemented method and computer product for creating searchable associations of a user's interaction with a computer system's resources comprising recording the user's interactions with the computer system's resources, and creating associations between the resources based on the user's interactions.

DESCRIPTION OF DRAWINGS

FIG. 2a is an example of methods of an embodiment of the present invention;

FIG. 2b is an example of methods of an embodiment of the present invention;

FIG. 8a is an example of method of an embodiment of the present invention;

FIG. 8b is an example of an alternative method of an embodiment of the present invention;

FIG. 8c is an example of an alternative method of an embodiment of the present invention;

FIG. 8d is an example of an alternative method of an embodiment of the present invention;

FIG. 10 is a table embodying sample associations between resources;

FIG. 12 is an alternative embodiment of the current invention as expressed in an UML diagram;

DETAILED DESCRIPTION

Figure 1:
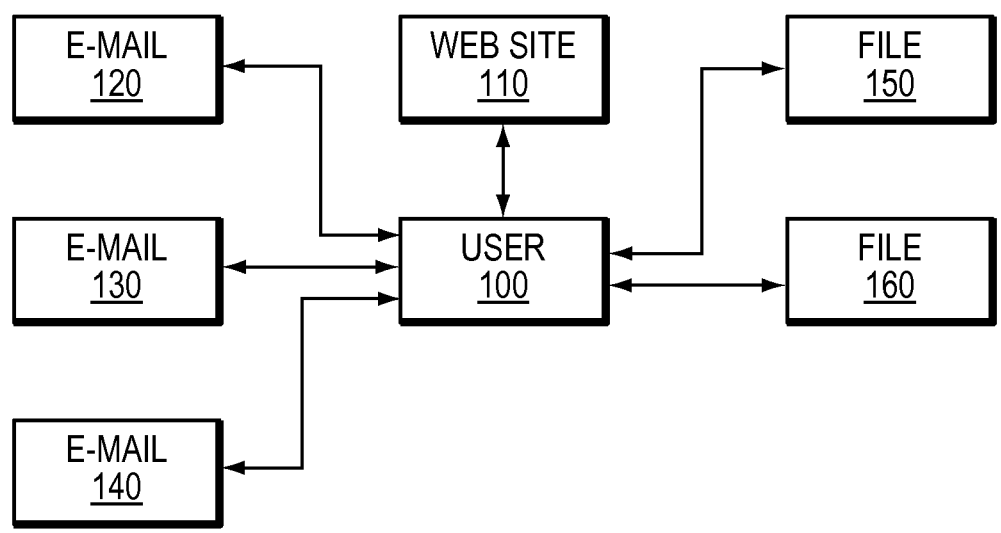
FIG. 1 is an embodiment of sample user interactions, in accordance with an embodiment of the present invention.

Traditional desktop search engines may only support keyword based search methods, herein after search, that may require exact keyword matching to find resources. However, users may have a vague picture of what is desired to be found, but forget the exact location or keyword to locate the resource. That is, people may remember some memory fragments related to the resource to be found and these memory fragments may be connected by memory cues of user activity context. An embodiment of the current invention provides an associative memory based desktop search system, which exploits such associations and contexts to enhance traditional desktop search.

Typical commercial desktop search products are based on full-text index and only support keyword search. These tools conventionally allow users to find information items by keywords and do not use semantic associations and contextual metadata. Therefore, they may be limited in terms of usefulness if users forget about the exact query terms.

A traditional desktop PC may have different kinds of resources such as general files and file hierarchies in a file system, email messages and attachments in the email store and offline web pages in the web cache. An embodiment of the current invention may track and record user activities and interaction with resources. In an embodiment of the current invention, the recorded activities may be used to connect desktop resources with semantic links mined from explicit and implicit user activities according to access patterns. In some embodiments, the record of user activities, both explicit and implicit, may be used to create associations with the resource with which the user interacted.

An embodiment of the current invention enables Content-based Associations (CA), Explicit Activity-based Associations (EAA) and Implicit Activity-based Associations (IAA). CAs may refer to associations that can be extracted from the content and attributes of resources. An EAA may be an explicit and deterministic activity based association between desktop resources. EAAs may be associations in the sense that they are bound with certain user activities such as jumping to another webpage. EAAs may be set when specific user events are observed. An IAA may denote some implicit to and nondeterministic associations between resources, which may be discovered by user access pattern analysis and resource provenance analysis.

Typical search engines may rank the results of a search, however these search engines usually provide text indexing and rely on textual information retrieval algorithms to rank their results, e.g. content-based ranking algorithms. Content-based ranking algorithms typically rank documents by their "relevance" to the given query. These algorithms may use heuristic distance functions to compare how "close" the query and indexed documents are.

An embodiment of the current invention may use file access patterns and implicit user tasks to search for a document. IAAs may be constructed to simulate human associative memory in the search process. In an embodiment of the current invention, a user's interactions with a computer system may be recorded. The recorded information may include what web sites the user visits, what documents, the user opens or edits, and what e-mails the user opens or views for a given time period T. For this given time period T, associations between the files, e-mails and web sites may be mined and created. These associations may denote that there are relationships between the files, e-mails, and web sites. In an alternative embodiment, the information recorded may then be used to allow the user to search for a file based on the created association.

Using semantic links, some embodiments of the current invention may allow associations among "memory fragments" to be built or rebuilt during a search. In alternative embodiments, a link-based ranking scheme may use these links together with a user's personal preferences to rank results by both relevance and importance to the user. In addition, some embodiments of the current invention may provide a faceted search feature and association graph navigation to help users refine and associate search results generated by full-text keyword search.

In a further embodiment, the current invention may allow a user to use faceted search filters to quickly locate an easy-to-remember intermediate resource from the full-text keyword search results. As well, the user may be able to find the target resource by navigation in the association graph.

Refer to FIGS. 1 and 2. In FIG. 1, say a user 100, during a given period, may interact with resources, such as web site 110, three e-mails 120, 130 and 140, and two files 150 and 160. The embodiment of the current invention of FIG. 2 may record 210 the user interactions between the user 110 and the resources 110, 120, 130, 140, 150, and 160

Figure 3:
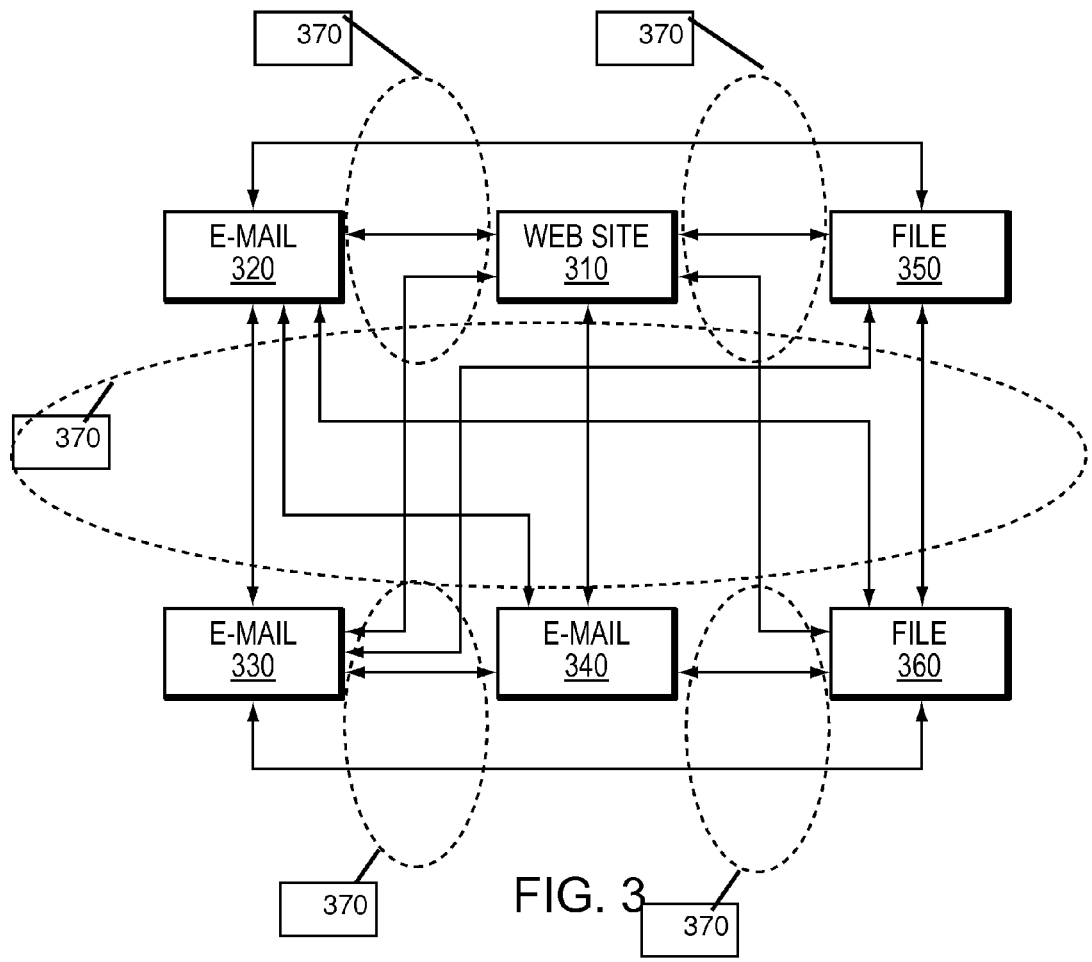
FIG. 3 is an embodiment of sample associations between resources.

Referring to the embodiments of FIGS. 2 and 3, an association 370 may be created 220 between these resources 310, 320, 330, 340, 350, 360. As well, the associations may be optimized 250. Further assume that a later point in time, the user would like to find File 350, however has no recollection of the name of file 350, where it is stored, or something that the file contains. For example, assume that file 350 is a picture and thus may not have human searchable text to identify file 350.

The current invention enables the user to leverage the associations 370, which connect the resources; i.e. the user may remember reading e-mail 320 or visiting web site 310 around the time that file 350 was viewed. In these embodiments, the associations 370 may be used to find this file. For example, an embodiment of the current invention may enable the user to search for and find e-mail 320, based on a keyword search. The current invention may have created an association between the e-mail 320 and the file 350. Thus, an embodiment of the current invention allows the user to find file 350 through a created association between e-mail 320 and file 350. The associations 370 can be based on any number of IAAs.

Figure 4:
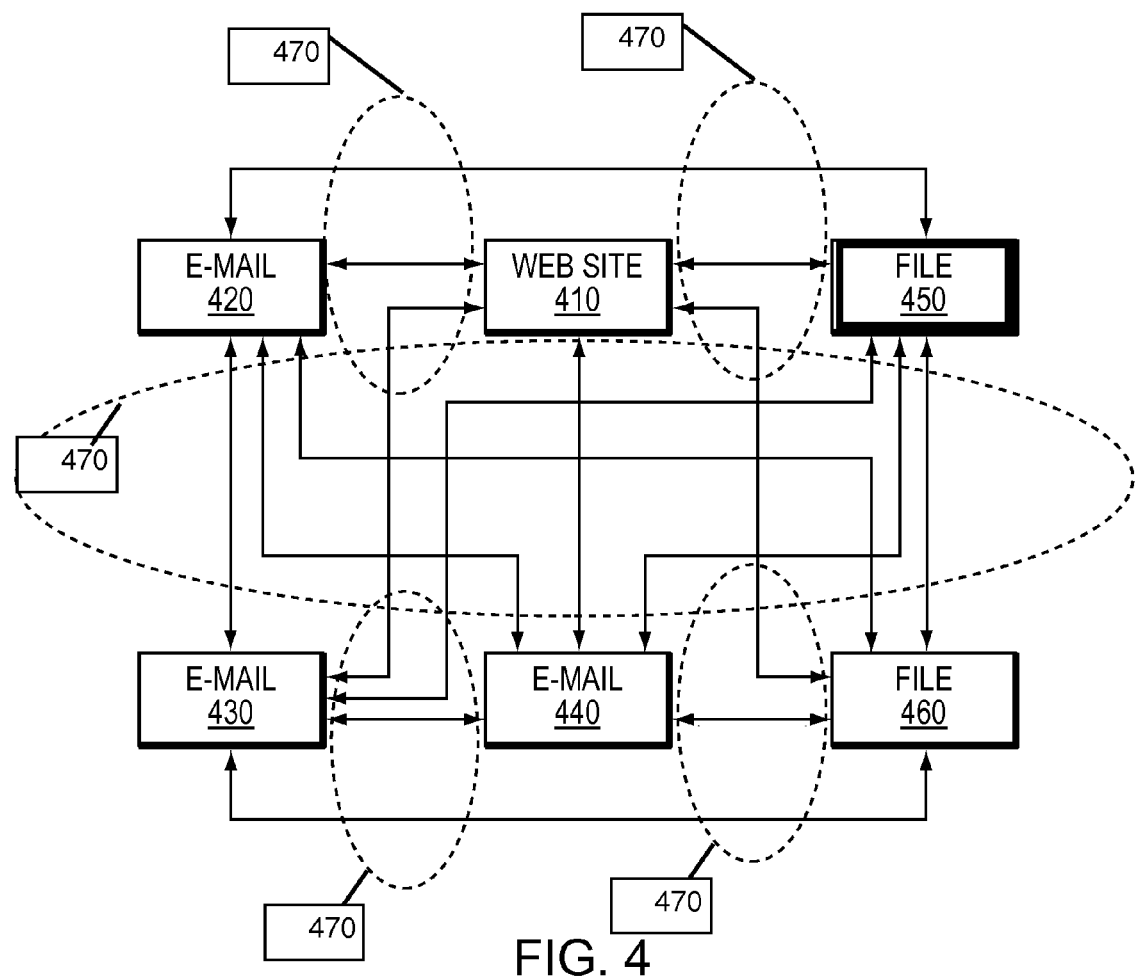
FIG. 4 is an embodiment of sample associations between resources as linked by a task.

In the alternative embodiment of FIG. 4, a resource, such as file 450, may be considered to be the central resource of the resources. This resource, such as file 450 in FIG. 4, may be used to cluster other resources around the central resource. In some embodiments, this central resource may define a task to which access to all resources are related. The clustering of FIG. 4 enables many IAAs to be created linking the resources, including across different resource types or access periods.

Figure 5:
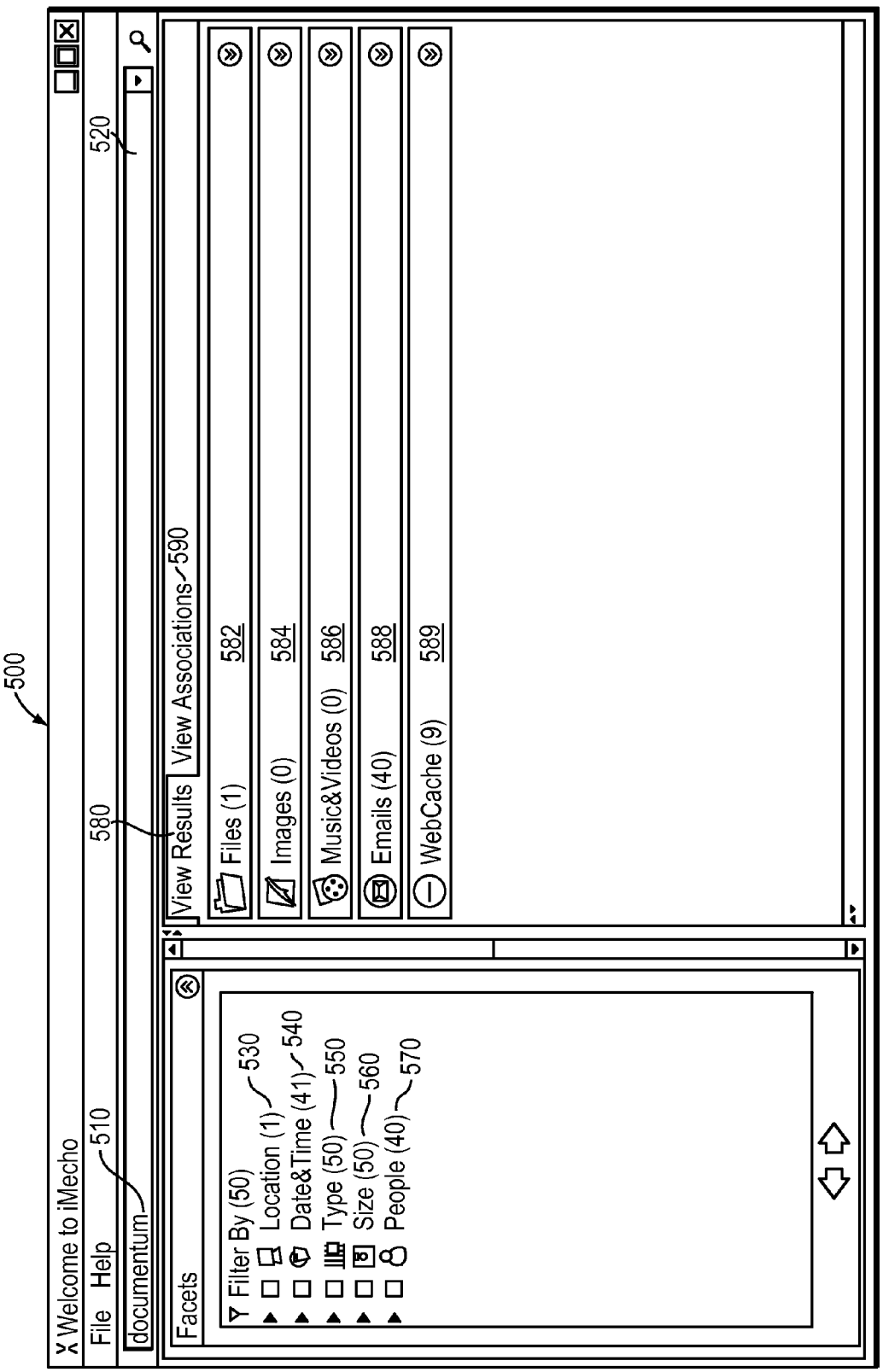
FIG. 5 is an embodiment of an UI of the current invention illustrating a keyword and filters.
Figure 6:
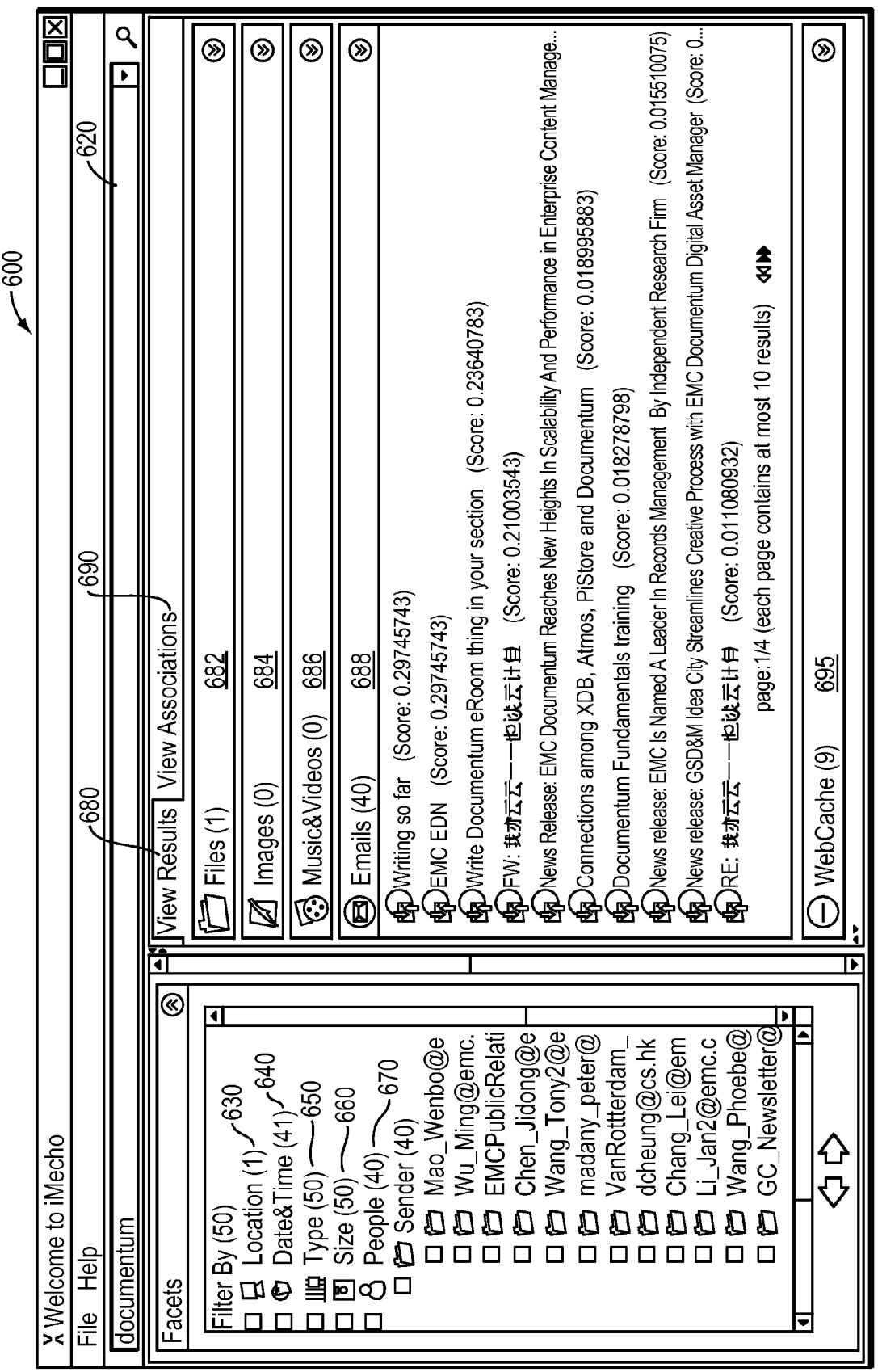
FIG. 6 is an embodiment of an UI of the current invention illustrating a result of keyword and search in a textual output.

Based on the associations, a User Interface (UI) can be presented to the user such as the UI 500 of the embodiment of FIG. 5. Consider the case where a user may know that the file he wants to find is in the same folder as some attachments that were downloaded from e-mail sent by a particular person and the e-mails may have something to do with Documentum. Referring to the embodiment of FIG. 5, the user may enter a keyword 510 in the UI 500, although a search could be done without a keyword. The user may filter the result by location 530, date and time 540, type 550, size 560, and people 570. This search may yield the search results in 580 grouped by files 582, images 584, music and videos 586, e-mails 588, and web-cache 589. In alternative embodiments, the filters and results could have more or less groupings depending on the embodiment. Expanding one of the search results in 580, for example Emails 588, may yield the textual list 695 illustrated in FIG. 6.

Figure 7:
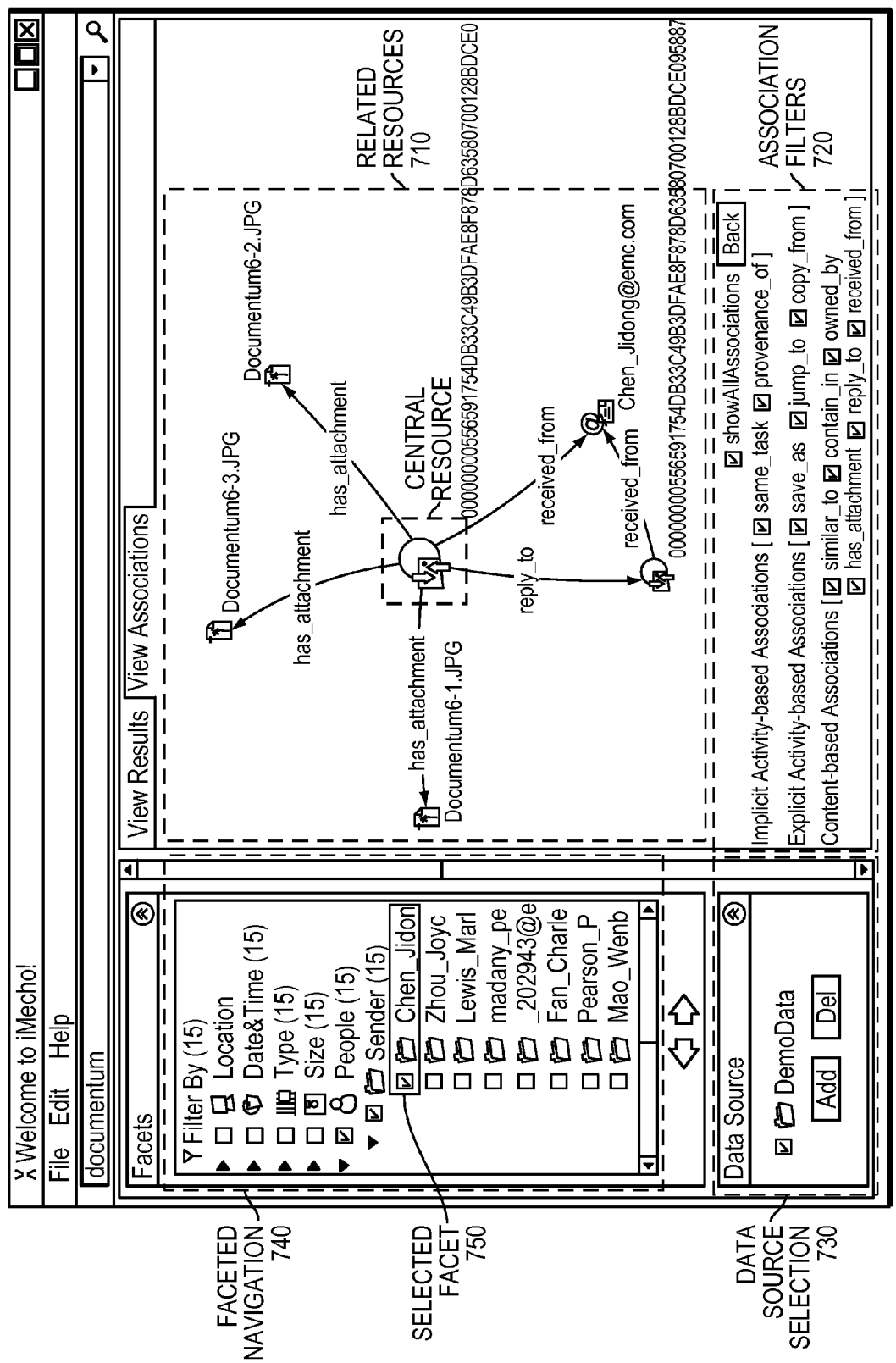
FIG. 7 is an embodiment of an UI of the current invention illustrating a result of keyword and search in a graphical output.

The user could then switch to the embodiment of the current invention shown in FIG. 7, which contains a graphical representation of the associations as the graph of Related Resources 710. FIG. 7 represents an embodiment of a GUI that may enable the user to interact and search within the associations. FIG. 7 also presents a set of association filers 720, a data source selection 730, a faceted navigation 740, and a selected facet navigation 750.

The resulting display reached in FIG. 7 gives the user several options for finding a resource based on an association. For example, in the embodiment of FIG. 7, the user may filter the associations created using such explicit filters as save as, jump to, or copy from. The user may also filer the displayed associations by the implicit associations such as "same task" or "provenance of." As well the user can filter the associations by content based associations such as similar to, contains, has attachment, reply to, or received from. Further examples of filters may be location of the file, type of the file, person or people related to the file, date and time, location and size. This gives the user the ability to control what associations are displayed as search results. Further, the user may also manipulate the related resources in 710 to traverse the graph.

Referring to FIG. 8a, the user may create a search 810, execute the search 815, and view the results of the search 820. As well, referring to FIG. 8b, the user may create a search 830, execute the search 835, view the results 840, and then filter the results 850. Further, referring to 8c the search results may be ranked 865 in the manner which they are displayed to the user. The ranking may alter the order in which the results are displayed in a list. As well, the ranking may influence the way the resource and associations may be displayed to the user, such as in a graph, by making associations more or less pronounced and making resources more or less pronounced. As well, referring to 8d, the search results may be ranked based on a personalized ranking criteria 890.

Figure 9:
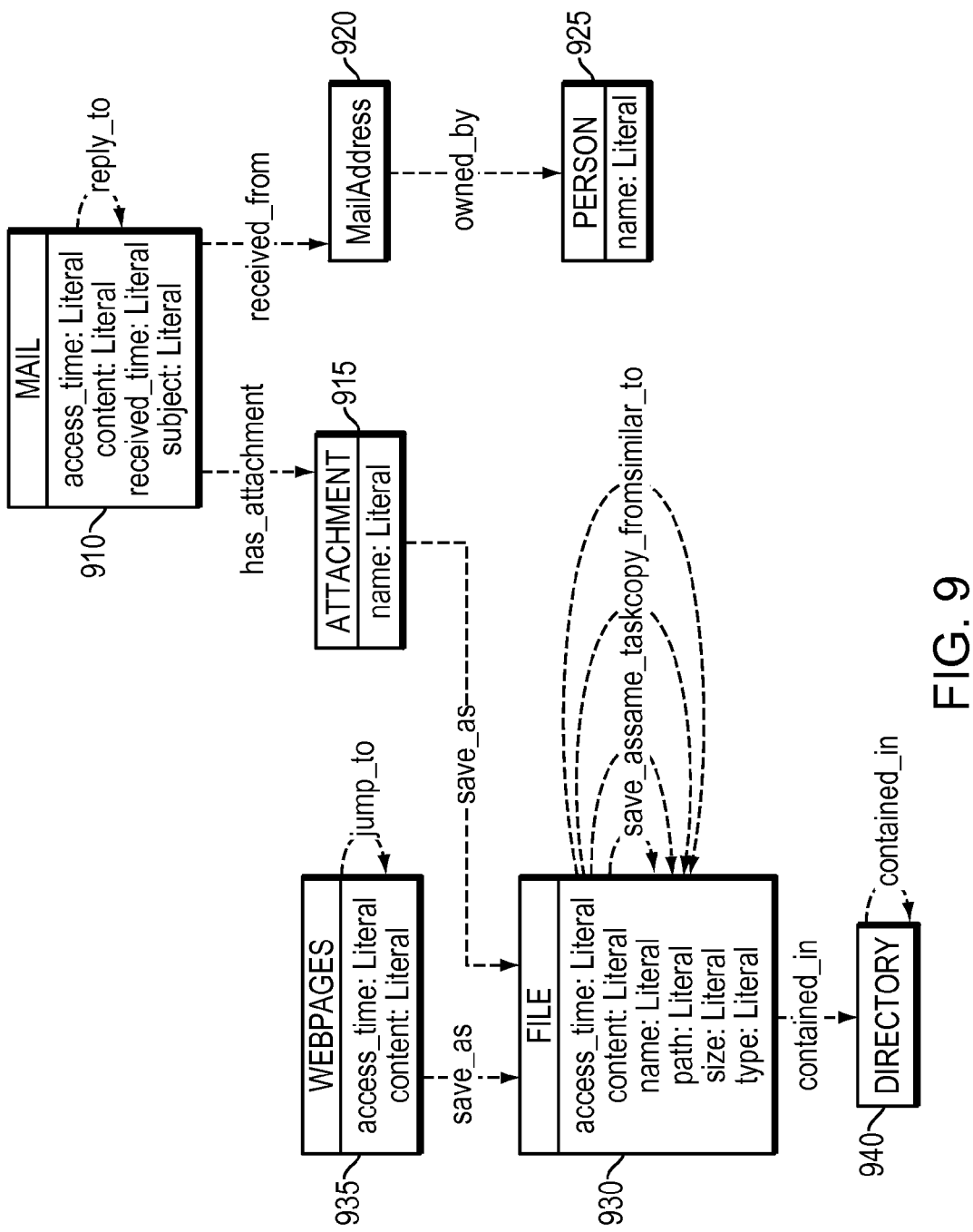
FIG. 9 is an embodiment of the current invention as expressed in an UML diagram.

FIG. 9 represents an UML diagram that represents an embodiment of a framework of the current invention expressing how different resource may be connected. In FIG. 9, the mail object 910 has an attachment 915 and a mail address 920. The mail address 920 is connected to a person 925. As well, the attachment 915 may be attached to a file 930. File 930 can represent many different resource types, such as web page 935. As well, file 930 may have a relation that it is stored in a directory 940. The table of FIG. 10 provides further examples of embodiments of relationships between resources and the type of relationship.

An embodiment of the current invention may further enable a clustering based algorithm for analysis of user activity sequence. An embodiment of the current technique may enable associations among desktop resources include CAs, EAs and IAAs. An IAAs can be created by recording and examining patterns of user interaction in a system. Users tend to access and manipulate different resources to complete a task.

For instance, when writing a paper, a user may look for related presentations, references, web pages and emails from colleagues. These resources may be related to this task. This type of links may be defined as same task, which corresponds to a special pattern of user activity sequences. A task can be taken as a series of user activities with a specific goal. Two document resources are associated via same task if they are involved in a same working task, i.e. they occur within the same temporal period.

A user may switch between different tasks in a given period of time. For example, a researcher may read a paper in the morning and then receive an email regarding an upcoming presentation. The researcher may work on the presentation, then turns to writing a research paper. Then, the researcher may return to reading the initial paper.

To create associations of related activities, an embodiment of the current invention may use a "key resource". A key resource may be the goal of a task and a key resource may be determined for a task. All other resources related to this task may be references or appendixes to the key resource.

Figure 11A:
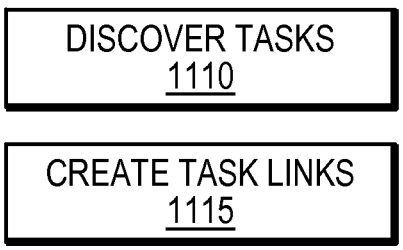
FIG. 11a is an example of method of an embodiment of the present invention.
Figure 11B:
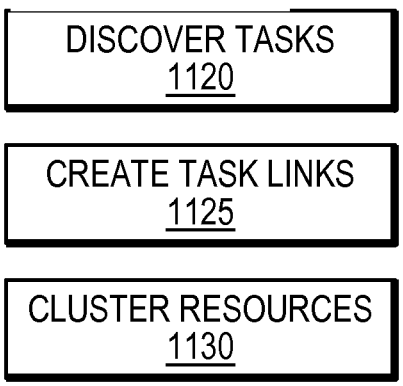
FIG. 11b is an example of an alternative method of an embodiment of the present invention.
Figure 11C:
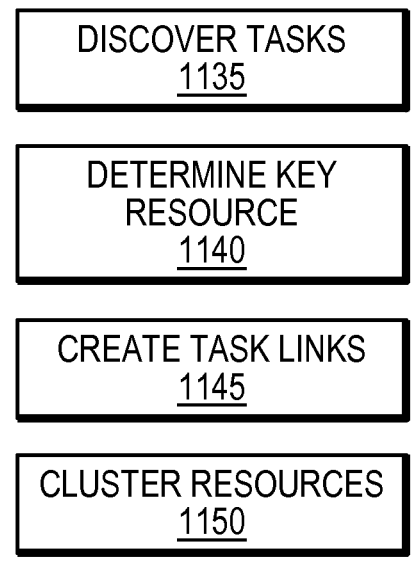
FIG. 11c is an example of an alternative method of an embodiment of the present invention.

For example, when a user is working on a task, the user may open all resources involved. Referring to FIG. 11a, tasks may be discovered 1110 and task links may be created 1115. In some cases there may be only one key resource, such as a paper. In some cases this paper, or key, may have the longest lifecycle (the time interval between opening and closing). Therefore, referring to FIG. 11b, it may be beneficial to cluster resources 1130 by the lifecycle of the resource. Referring to FIG. 11c, if the lifecycle of resource A is completely covered by that of resource B, then A and B may go become part of one cluster. The resource that has the longest lifecycle may be the key of the cluster and the key resource may be determined 1140. If the lifecycles of two keys are overlapped, the two clusters may be merged. When no clusters can be merged, each cluster may be output as one task. All resources in the cluster may be connected by the same task link.

A task T may be defined as a set of resources. If resource a is accessed by the user when he is accomplishing task T, it may be denoted that a∈T. As well, a resource a may belong to several tasks, which may mean that a is used several times for different purposes.

As well, the lifecycle of resource A (denoted as $L^k$(a), k may be the occurrence index of a in the log) is the gap between opening time ($O^k$(a)) and closing time ($(a)$) of its time window, i.e., $L^A(a) = C^k(a) - O^k(a) \cdot |L^k(a)|$ may be the length of $L^A$(a). The index k may be omitted if no misunderstanding occurs. If L(b) is completely covered by L(a), then L(b)⊂L(a) or L(a)⊃L(b). If L(a) and L(b) are overlapped, which means that the user opens b before closing a or vice versus, L(a)≈L(b). If L(b)⊂L(a) or L(a)⊂L(b), then L(a)≈L(b). A resource may have several lifecycles in a given period of time with different k.

In some embodiments of the current invention, there may be one key resource in a given task. The key resource of task T may be denoted as K(T). In some embodiments, the key resource may serve as the goal of the task, which may result in there being one key resource in a task. As well, in some embodiments, a key resource may have the longest lifecycle among all the resources in the corresponding task, i.e., ∀a∈T, |L(K(T))|≥|L(a)|.

In alternative embodiments, the user may open the key resource and keep using the resource until the task is completed. In alternative embodiments, some users may open the key resource for a very short period of time and then close it. In further embodiments, some user may repeatedly open and close the key resource.

In some embodiments of the current invention, a Task T may start when its key resource K(T) is opened and T may stop when K(T) is closed. All the overlapping resources of K(T) may be associated with task T, i.e., ∀a, if K(a)≈K(T) then a∈T. Other embodiments of the current invention may a heuristic task mining algorithm. As, in some embodiments, the boundary of a task may be determined by its key resource. The key resources may be used to create the associations between resources.

Another embodiment of the current invention may create semantic associative links among desktop resources from the analysis of user activity context, which enable calculation of a personalized link-based ranking algorithm fixated based on link structures and the user preferences. According to an embodiment, a user may start with a random resource. The user may then access one of the resources that are related to the current resource with certain probabilities, where the probability of access may be in direct proportion to the importance of the outgoing links in FIG. 9 and FIG. 12. As well the user may go to a resource with a probability that is proportional to the frequency the resource appears in the user log.

In an embodiment of the current invention, a top ranked document may be relevant to the query and may be important to the user in the result set. For example, an embodiment of the current invention uses a combination of the relevance score from the content-based ranking and the importance score from the link-based ranking. The ranking score of a resource e given query q may be denoted as $S^q(e)$. Suppose $E^q(e)$ is the relevance score between e and q, R(e) may be the importance score of e, then $$S^q(e) = E^q(e) * R(e)$$

$E^q(e)$ may be given by the content-based ranking algorithm in the query time. And R(e) may be calculated by the link-based algorithm, as explained herein. As PageRank, a typical link-based ranking algorithm, an embodiment of the current invention for ranking may be an offline algorithm which runs periodically on the dataset.

In an alternative embodiment, users may manually assign weights to different types of links such that user weighted links may contribute more to the final results. The weights may show the user preferences. The implicit user feedback may tune ranking parameters according to user activity logs. This may result in different users getting different ranking results given the same query.

In an embodiment of the current invention, there may be different types of links. In the embodiment of FIG. 12, weights and edges may be added in order to express how importance propagates among the entities and resources inside the graph of FIG. 9. For example, authority of an email may be split among the sender of the email, its attachment, the date when it was sent and the email to which it was replied. If an email is important, the sender may be an important person, and the attachment may be an important one. Additionally, the date when the email was sent and the previous email in the thread hierarchy may also become important.

In some embodiments, different weights may be manually assigned to different types of links. Every edge from the graph of FIG. 9 may be split into two edges, one for each direction.

In the embodiment of FIG. 12, links between different types of resources and weights of these links are shown. A user may be more likely to follow links with higher weight according to our model. Therefore nodes pointed by these links may be more likely to be visited by the user. In FIG. 12, there are twice as many links as that in FIG. 9. For any link in FIG. 9 (dashed line), there is an opposite "rev" link (real line) in FIG. 12. Let's take "copy from" as an example. Suppose file A is a copy of file B, i.e. A $\xrightarrow{copy\,from}$ B, then the importance of A may affect B and vice versa.

The opposite link may have different weight comparing to the original link. For instance, the weight of "copy from" is 0.7 and that of "rev copy from" is 0.2. Suppose file B is a copy of file A, B may have some new contents which are not in A. If the user has opened A, he may be interested in B too. However, if the user has read B, he may not be as interested in A because B is newer.

In this embodiment, the weights of all outgoing links of a node in FIG. 12 are not summarized to 1. FIG. 12, in some embodiments is the global view of the "importance" of all types of links so that different kinds of links can be comparable in terms of importance. Users can easily find that "same task" is more important than "owned by". If the weights are normalized, the importance of links from different resources (such as "same task" and "owned by") can not be compared. In the following algorithm specification (Transition Matrix Initialization), all outgoing weights of a resource (not a type of resource) are summarized to 1.

Different authority transfer weights may express different preferences of the user, translating into personalized ranking. The user activities that influence the ranking computation may also be taken into account, which may translate assign different weights to different contexts. The weights may show the user preferences. In addition, the ranking may be implicitly personalized by analyzing the user activity logs. In some embodiments this may be achieved by examining the activity logs to calculate the access frequency of each resource. In this way, a resource that is visited more often may get a higher rank in the search.

In some embodiments of the current invention, the computation of rankings may be based on the link structure of the resources as specified by the graph of FIG. 12 and the corresponding metadata. C may be a directed graph of connected desktop resources. Suppose n is the number of nodes in the graph C, $\vec{e}_k$ denotes the (n×1) access probability vector, i.e. the importance score vector, after k rounds, there is $$\vec{r}_0 = (1/n, \ldots, 1/n)^T \tag{1}$$

$$\vec{r}_k = (d*A^T + (1-d)*E) \times \vec{r}_{k-1} \tag{2}$$

In this embodiment, d is the dumping factor and it is set to 0.85. Matrix A which may be a Transition Matrix, may denote the weighted graph of indexed files. After some algebra, equation 2 turns to:

$$\vec{r}_k = d*A^T \times \vec{r}_{k-1} + (1-d)*\vec{e} \tag{3}$$

$\vec{e}$ is a Personalization Vector that $$e_i = c_i \bigg/ \sum_{i=1}^{n} c_i$$

(c is the number of occurrences of resource i in the user log and if file i does not appear in the log, c is set to 1).

In an embodiment of the current invention, the ranking may occur in phases. A transition matrix may be initialized the ranking scores of every nodes may be iteratively calculated. The initialization phase may be completed by the following algorithm with the following assumptions. Suppose i $\xrightarrow{k}$ j means directed edge i→j is of type k, $d_i^k$ means the number of outgoing type k links from node i and wk stands for the weight of type k links in FIG. 13, then transition matrix A may be computed by the following algorithm.

Input: Resource Graph G and Weighted Graph W
Output: Transition Matrix A
FOR i FROM 1 TO n
FOR j FROM 1 TO n
IF i→j is not an edge of C
$A_{ij}$ // i and j are not connected
CONTINUE
ELSE
i $\xrightarrow{k}$ j $$A_{ij} = w^k / d_i^k \quad // \text{Different from PageRank}$$

END IF
END FOR $$W_i = \sum_{j=1}^{n} A_{ij}$$

FOR j FROM 1 TO n
$A_{ij} = A_{ij}/W_i$ // Normalize Each Vector END FOR
END FOR Matrix A may be the adjacency matrix which connects all available instances of the existing graph on one's desktop. The weights of the links between the instances correspond to the weights specified in the graph of FIG. 12 divided by the number of the links of the same type. When instantiating the graph for the resources existing on the user's desktop, the corresponding matrix A may have elements which can be either 0, if there is no edge between the corresponding entities in the data graph, or it may have the value of the weight assigned to the edge determined by these entities, in the graph of FIG. 12, divided by the number of outgoing links of the same type. For example, consider an embodiment where node i has 5 outgoing links, 2 of them are of type A and others are of type B. The weights of type A and B are 0.4 and 0.6 respectively. After normalization the weight of every outgoing link is 0.2.

An embodiment of the iteration phase may be follows:

Input: Transition Matrix A, dumping factor d, Personalization Vector e and the threshold $\epsilon$.

Output: Ranking score vector r $\vec{e} = (1/n, \ldots, 1/n)^T$ $\vec{r}' = (0, 0, \ldots 1)$

WHILE TRUE $\vec{r}_k = d * A^T \times \vec{r}_{k-1} + (1-d) * \vec{e}$

IF $(|\vec{r}' - \vec{r}| \le \epsilon)$ // has converged already

BREAK

ELSE $\vec{r} = \vec{r}'$

END IF

END WHILE

Figure 13:
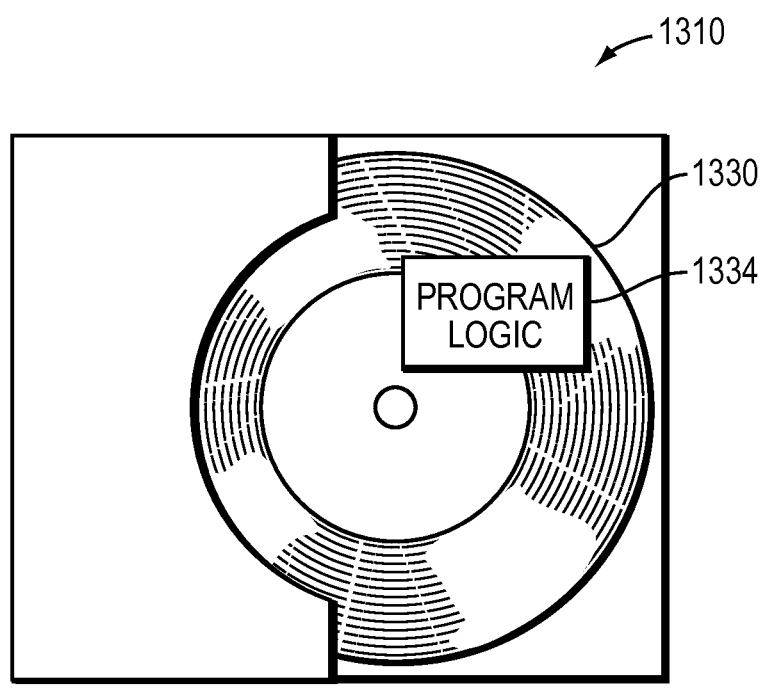
FIG. 13 is an embodiment of the current invention embodied in program code.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 13 shows Program Logic 1334 embodied on a computer-readable medium 1330 as shown, and wherein the Logic is encoded in computer-executable code configured for carrying out the reservation service process of this invention and thereby forming a Computer Program Product 1310.

Figure 14:
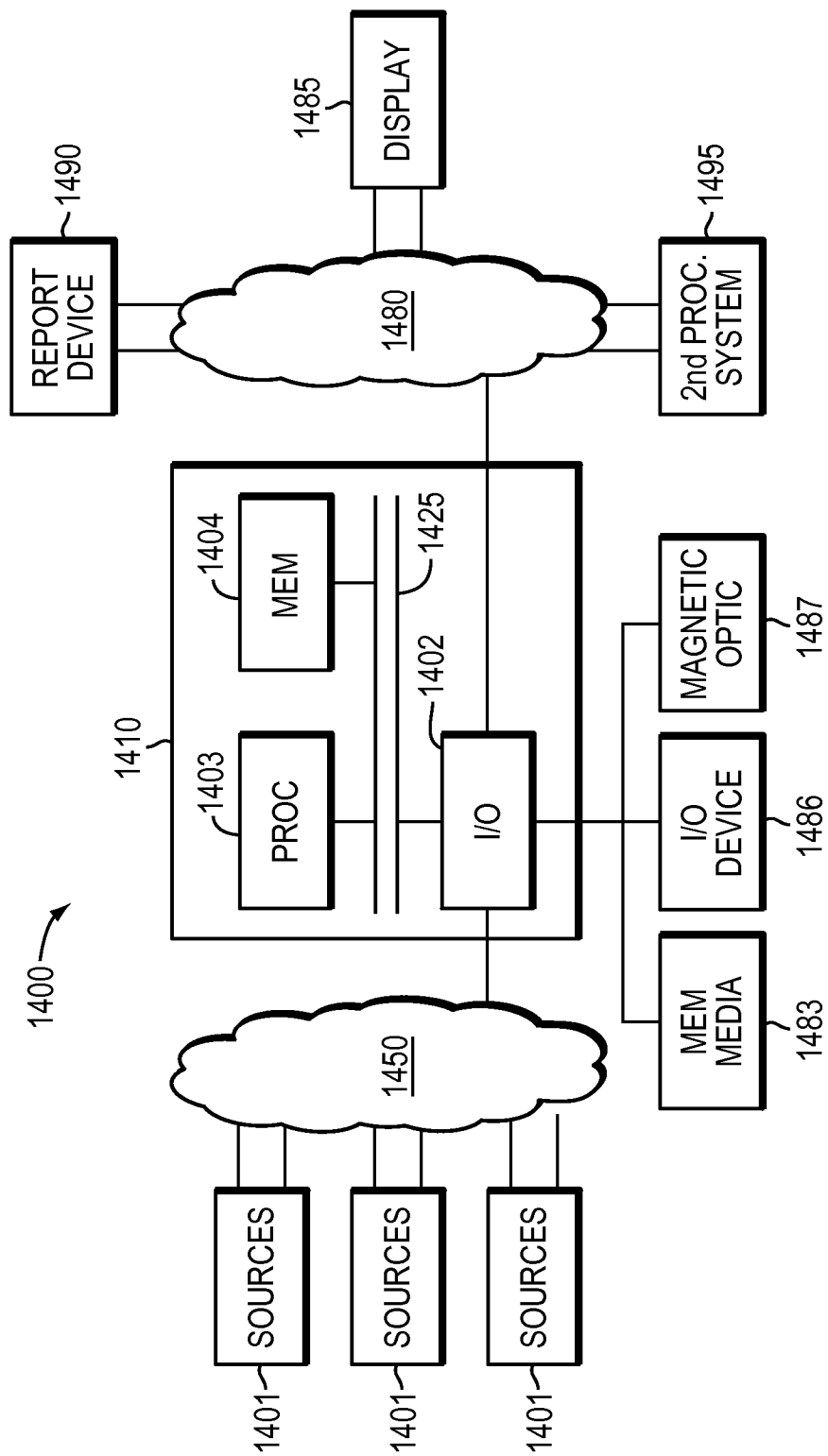

The logic for carrying out the method may be embodied as part of the system described below of FIG. 14, which is useful for carrying out a method described with reference to embodiments shown in, for example, FIG. 2 and FIG. 3. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer implemented method for searching resources of a computer system comprising:

enabling a user to input a keyword, wherein the keyword is used to generate a list of search results corresponding to resources; wherein the resources include files accessed by the user on the computer system;

enabling the user to select one or more filters from a plurality of filters, wherein selection of a filter, from the plurality of filters, filters the list of search results of the resources based on the selected filter; wherein the list of filters includes one or more implicit activity-based associations (IAA); wherein the IAAs denote implicit, non-deterministic associations between resources based on interactions between the user and the resources before the search occurred; wherein the search results are clustered by the one or more IAAs; wherein at least one of the filters is a lifetime of a resource filter, wherein the selection of a lifetime of a resource filter includes selection of first resource; wherein the lifetime of a resource filter filters the resources to filter those resources of the plurality of resources not accessed during the lifetime of the first resource; wherein the lifetime of a resource is the time between when the resource of the plurality of resources was opened and closed on the computer system; and displaying the search results corresponding to resources and associations for the filtered list of the search results based on the keyword and selection of filters; wherein each resource corresponds to one or more associations; wherein the associations represent a user's interactions with a group of the resources of the computer system within the lifetime of the resource corresponding to the search result.

2. The method of claim 1 wherein the resources and associations are displayed in a connected graph; wherein the connections of the graph represent the associations between the resources.

3. The method of claim 2 further comprising enabling the user to manipulate the graph to find related resources.

4. The method of claim 3 further comprising:

ranking the resources based on the relevance to the keyword and importance to the user.

5. The method of claim 4 further comprising:

enabling the user to query a set of associations related to the search results.

6. A computer implemented method for creating searchable associations of a user's interaction with a computer system's resources comprising:

recording the user's interactions with the computer system's resources; wherein the computer system's resources include files accessed by the user on the computer system; and creating associations between the resources based on the user's interactions; wherein the associations group resources together that are accessed by the user within a time range to create a time based association of the grouped resources based on the time between when a resource is opened and closed on the computer system; wherein creating associations include:

defining one or more tasks, wherein each task is associated with a set of resources used within the computer system by the user in a given period; wherein the resources can belong to several tasks;

defining a lifecycle for at least one of the resources; wherein the lifecycle represents the time between the opening and closing of the resource on the computer system; wherein at least one association for the resource is associating other resources accessed between the opening and closing of the resource on the computer system with the resource; and defining a key for each of the one or more tasks, wherein the key is based on the lifecycles for resources in the set of one or more resources for the each task of the one or more tasks.

7. The method of claim 6 wherein the associations denote a commonality between the resources based on the user's interactions, file access patterns, and implicit user tasks of user activity sequences.

8. A program product for searching resources of a computer system comprising, the program product comprising:
- a non-transitory computer-readable storage medium encoded with computer-executable program code enabling:
- enabling a user to input a keyword, wherein the keyword is used to generate a list of search results corresponding to resources; wherein the resources include files accessed by the user on the computer system;
- enabling the user to select one or more filters of a plurality of filters, wherein selection of a filter, of the plurality of filters, filters the list of search results of the resources; wherein the list of filters includes one or more implicit activity-based associations (IAA); wherein the IAAs denote implicit, nondeterministic associations between resources based on interactions between the user and the resources before the search occurred; wherein the search results are clustered by the one or more IAAs; wherein at least one of the filters is a lifetime of a resource filter, wherein the selection of a lifetime of a resource filter includes selection of first resource; wherein the lifetime of a resource filter filters the resources to filter those resources of the plurality of resources not accessed during the lifetime of the first resource; wherein the lifetime of a resource is the time between when the resource of the plurality of resources was opened and closed on the computer system; and
- displaying the resources and associations between the filtered list of the resources based on the keyword and selection of filters; wherein the associations represent a user's interactions with the resources of the computer system.

9. The program product of claim 8 wherein the resources and associations are displayed in a connected graph; wherein the connections of the graph represent the associations between the resources.

10. The program product of claim 9 further comprising enabling the user to manipulate the graph to find related resources.

11. The program product of claim 10 further comprising:
- ranking the resources based on the relevance to the keyword and importance to the user.

12. The program product of claim 11 further comprising:
- enabling the user to query a set of associations related to the search results.

13. A program product for searching resources of a computer system comprising, the program product comprising:
- a non-transitory computer-readable storage medium encoded with computer-executable program code enabling:
- recording the user's interactions with the computer system's resources; wherein the computer system's resources include files accessed by the user on the computer system; and
- creating associations between the resources based on the user's interactions; wherein the associations group resources together that are accessed by the user within a time range to create a time based association of the grouped resources based on the time between when a resource is opened and closed on the computer system; wherein creating associations include:
- defining one or more tasks, wherein each task is associated with a set of resources; wherein the resources can belong to several tasks;
- defining a lifecycle for at least one of the resources of the sets of resources used within the computer system by the user; wherein at least one association for the resource is associating other resources accessed between the opening and closing of the resource on the computer system with the resource; and
- defining a key for each of the one or more tasks, wherein the key is based on the lifecycles for resources in the set of one or more resources for the each task of the one or more tasks.

14. The computer product of claim 13 wherein the associations denote a commonality between the resources based on the user's interactions, file access patterns, and implicit user tasks of user activity sequences.

15. The method of claim 6 further comprising:
- creating semantic associative links among resources based on the analysis of user activity; and
- calculating a personalized link-based rank based on the links and user preferences.

16. The method of claim 15 further comprising:
- defining one or more implicit activity-based associations (IAA); wherein the IAAs denote implicit, nondeterministic associations between resources; and
- clustering the search results are clustered by the one or more IAA.

17. The method of claim 1 further comprising:
- creating semantic associative links among resources based on the analysis of user activity; and
- calculating a personalized link-based rank based on the links and user preferences.

18. The method of claim 1 further comprising:
- defining one or more tasks, wherein each task is associated with a set of resources; wherein the resources can belong to several tasks;
- defining a lifecycle for at least one of the resources of the sets of resources; and
- defining a key for each of the one or more tasks, wherein the key is based on the lifecycles for resources in the set of one or more resources for the each task of the one or more tasks.

19. The method of claim 17 further comprising:
- enabling the user to manually assign weights to different types of links.

20. The method of claim 2 further comprising:
- providing the user with the weights of the connections of the connected graph.

* * * * *